(12) United States Patent
Yang et al.

(10) Patent No.: US 12,235,850 B2
(45) Date of Patent: Feb. 25, 2025

(54) SYSTEMS AND METHODS FOR ONLINE ADAPTATION FOR CROSS-DOMAIN STREAMING DATA

(71) Applicant: Salesforce, Inc., San Francisco, CA (US)

(72) Inventors: Luyu Yang, District of Columbia, DC (US); Mingfei Gao, Sunnyvale, CA (US); Zeyuan Chen, Palo Alto, CA (US); Ran Xu, Mountain View, CA (US); Chetan Ramaiah, San Bruno, CA (US)

(73) Assignee: Salesforce, Inc., San Francisco, CA (US)

( * ) Notice: Subject to any disclaimer, the term of this patent is extended or adjusted under 35 U.S.C. 154(b) by 40 days.

(21) Appl. No.: 17/588,022

(22) Filed: Jan. 28, 2022

(65) Prior Publication Data

US 2023/0153307 A1 May 18, 2023

Related U.S. Application Data

(60) Provisional application No. 63/280,941, filed on Nov. 18, 2021.

(51) Int. Cl.
*G06F 16/2455* (2019.01)
*G06F 16/242* (2019.01)
*G06N 20/00* (2019.01)

(52) U.S. Cl.
CPC .... *G06F 16/24568* (2019.01); *G06F 16/2425* (2019.01); *G06N 20/00* (2019.01)

(58) Field of Classification Search
CPC .......... G06F 16/24568; G06F 16/2425; G06F 21/6245; G06F 21/6263; G06N 20/00
See application file for complete search history.

(56) References Cited

U.S. PATENT DOCUMENTS

| 11,816,185 | B1 * | 11/2023 | Roth | G06N 3/08 |
|---|---|---|---|---|
| 2016/0378919 | A1 * | 12/2016 | McNutt | G16H 40/63 |
| | | | | 705/3 |
| 2020/0050984 | A1 * | 2/2020 | Liang | G06Q 10/1053 |
| 2021/0182600 | A1 * | 6/2021 | Yu | G06N 5/022 |
| 2021/0264111 | A1 * | 8/2021 | Aditya | G06N 3/08 |
| 2021/0406744 | A1 * | 12/2021 | Dutt | G06F 18/217 |
| 2022/0012595 | A1 * | 1/2022 | David | G06N 3/044 |
| 2022/0327689 | A1 * | 10/2022 | Gilbertson | G06V 10/82 |
| 2023/0290184 | A1 * | 9/2023 | Filipowicz | G06Q 10/06 |

\* cited by examiner

*Primary Examiner* — Courtney Harmon
(74) *Attorney, Agent, or Firm* — Haynes and Boone, LLP (57) ABSTRACT

Embodiments described herein provide an online domain adaptation framework based on cross-domain bootstrapping for online domain adaptation, in which the target domain streaming data is deleted immediately after adapted. At each online query, the data diversity is increased across domains by bootstrapping the source domain to form diverse combinations with the current target query. To fully take advantage of the valuable discrepancies among the diverse combinations, a set of independent learners are trained to preserve the differences. The knowledge of the learners is then integrated by exchanging their predicted pseudo-labels on the current target query to co-supervise the learning on the target domain, but without sharing the weights to maintain the learners' divergence.

18 Claims, 10 Drawing Sheets

| Methods (Syn→Real) | plane | bike | bus | car | horse | knife | motor | person | plant | skate | train | truck | Online | One-pass | Per-Class Acc. |
|---|---|---|---|---|---|---|---|---|---|---|---|---|---|---|---|
| Source-Only | 67.7 | 22.4 | 50.0 | 61.7 | 69.5 | 13.7 | 85.9 | 11.5 | 64.4 | 34.4 | 84.2 | 19.2 | - | - | 49.1 |
| DAN | 84.4 | 50.9 | 68.4 | 66.8 | 82.0 | 17.0 | 82.5 | 22.0 | 73.3 | 47.4 | 81.2 | 18.3 | - | - | 57.8 |
| Offline CORAL | 84.7 | 46.8 | 78.0 | 62.4 | 86.5 | 70.1 | 80.4 | 73.3 | 84.2 | 34.9 | 87.7 | 24.9 | - | - | 68.5 |
| DANN | 81.9 | 77.7 | 82.8 | 44.3 | 81.2 | 29.5 | 65.1 | 28.6 | 51.9 | 54.6 | 82.8 | 7.8 | - | - | 57.4 |
| ENT | 88.6 | 29.5 | 82.5 | 75.0 | 88.7 | 16.0 | 83.2 | 63.4 | 84.2 | 40.1 | 87.3 | 12.1 | - | - | 64.3 |
| MDD | 89.2 | 58.9 | 70.5 | 54.5 | 77.1 | 42.9 | 78.8 | 22.3 | 66.6 | 53.7 | 88.6 | 15.4 | - | - | 59.6 |
| CDAN | 89.4 | 40.3 | 73.6 | 65.2 | 81.5 | 62.2 | 90.1 | 69.3 | 73.3 | 58.6 | 83.8 | 19.1 | - | - | 67.4 |
| SHOT | 94.3 | 88.5 | 80.1 | 57.3 | 93.1 | 94.0 | 80.7 | 80.3 | 91.5 | 89.1 | 86.3 | 58.2 | - | - | 82.9 |
| ATDOC-NA | 95.3 | 84.7 | 82.4 | 75.6 | 95.8 | 97.7 | 88.7 | 76.6 | 94.0 | 92.7 | 87.5 | 62.0 | - | - | 86.3 |
| Source-Only | 73.3 | 6.5 | 44.9 | 67.8 | 58.6 | 5.7 | 67.2 | 18.3 | 47.7 | 19.2 | 84.1 | 9.3 | 46.7 | 41.9 | - |
| DAN | 87.7 | 45.0 | 66.9 | 70.9 | 77.4 | 17.7 | 80.7 | 18.6 | 70.9 | 29.0 | 82.7 | 16.6 | 57.8 | 56.5 | - |
| CORAL | 94.7 | 51.0 | 79.6 | 65.2 | 88.2 | 69.4 | 91.1 | 73.1 | 87.7 | 41.8 | 88.4 | 24.2 | 66.7 | 71.0 | - |
| Online DANN | 84.5 | 39.2 | 70.2 | 60.4 | 77.1 | 28.6 | 90.9 | 20.9 | 67.7 | 39.9 | 80.8 | 10.5 | 49.0 | 56.8 | - |
| ENT | 87.1 | 14.8 | 87.9 | 71.9 | 87.8 | 90.9 | 90.3 | 0.0 | 5.2 | 15.0 | 80.4 | 0.2 | 55.8 | 53.3 | - |
| MDD | 95.1 | 52.2 | 87.9 | 57.9 | 90.3 | 94.8 | 88.4 | 45.7 | 76.2 | 50.5 | 77.7 | 25.7 | 60.4 | 70.1 | - |
| CDAN | 88.5 | 44.3 | 74.3 | 68.4 | 80.3 | 60.2 | 89.9 | 69.9 | 74.3 | 57.1 | 84.8 | 13.0 | 62.3 | 67.1 | - |
| C10tDo10o | 94.8 | 87.5 | 80.5 | 76.0 | 94.9 | 93.7 | 88.7 | 80.1 | 94.8 | 88.4 | 84.6 | 20.7 | 79.4 | 84.0 | - |

FIG. 5

| Methods (Pneumonia → Covid) | | Online | One-pass | Offline |
|---|---|---|---|---|
| Offline & Online | Source-Only | 83.6 | 82.0 | 88.9 |
| | DAN | 84.4 | 85.7 | 87.7 |
| | CORAL | 67.6 | 45.4 | 65.4 |
| | DANN | 83.0 | 87.1 | 87.7 |
| | ENT | 84.3 | 87.3 | 89.8 |
| | MDD | 83.2 | 86.2 | 81.0 |
| | CDAN | 83.0 | 86.4 | 86.3 |
| | SHOT | - | - | 93.2 |
| | ATDOC-NA | - | - | 98.1 |
| | COVID-DA* | - | - | 98.1 |
| | CRoDoBo | 96.5 | 97.1 | - |

*FIG. 6*

| Methods (Hospital 1,2,3 → Hospital 5) | | Online | One-pass | Offline |
|---|---|---|---|---|
| Domain Generalization | ERM | - | - | 70.3 |
| | Group DRO | - | - | 68.4 |
| | IRM | - | - | 64.2 |
| | FISH | - | - | 74.7 |
| Offline & Online | Source-Only | 71.7 | 60.1 | 63.6 |
| | DAN | 76.3 | 78.0 | 69.0 |
| | CORAL | 66.0 | 87.1 | 85.0 |
| | DANN | 76.4 | 81.4 | 86.7 |
| | ENT | 83.1 | 82.3 | 87.5 |
| | MDD | 77.8 | 52.5 | 63.7 |
| | CDAN | 62.7 | 60.1 | 58.5 |
| | SHOT | - | - | 73.8 |
| | ATDOC-NA | - | - | 86.3 |
| | CRoDoBo | 89.2 | 91.9 | - |

| Methods (F-MNIST → DeepFashion) | | Online | One-pass | Offline |
|---|---|---|---|---|
| Offline & Online | Source-Only | 22.7 | 15.8 | 23.1 |
| | DAN | 40.7 | 42.0 | 32.7 |
| | CORAL | 40.4 | 40.7 | 39.6 |
| | DANN | 35.6 | 26.5 | 40.5 |
| | ENT | 31.9 | 31.2 | 31.1 |
| | MDD | 36.5 | 38.0 | 39.0 |
| | CDAN | 45.4 | 47.6 | 47.2 |
| | SHOT | - | - | 42.3 |
| | ATDOC-NA | - | - | *47.4* |
| | CroDoBo | 49.1 | 46.3 | - |

SYSTEMS AND METHODS FOR ONLINE ADAPTATION FOR CROSS-DOMAIN STREAMING DATA

CROSS REFERENCE(S)

The present application is a nonprovisional of and claims priority under 35 U.S.C. 119 to U.S. provisional application No. 63/280,941, filed Nov. 18, 2021, which is hereby expressly incorporated herein by reference in its entirety.

TECHNICAL FIELD

The present disclosure relates generally to machine learning models and stream data processing, and more specifically, to online adaptation for cross-domain streaming data.

BACKGROUND

Internet users often tend to leave significant amounts of digital footprints, e.g., by sharing texts, photos, videos or other forms of media via social media, via purchase orders and browsing history, via share ride histories, via registration at a website, and/or the like. As a lot of user shared data may exist on the Internet for an extended period of time, online privacy of users become increasingly difficult to preserve. Some recommendation systems may actively use user data for mining user interests and developing data-driven algorithms, only rendering the right to privacy more challenging. The Right to Be Forgotten (RTBF) movement grants Internet the right to ask an organization to delete their personal data.

Therefore, there is a need to for an efficient data privacy protection mechanism.

BRIEF DESCRIPTION OF THE DRAWINGS

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Recommendation systems often actively use user data for mining user interests and developing data-driven algorithms, creating an issue that violates the right to privacy. Some existing systems may attempt to try to preserve user privacy via Federated Leaning, which limits sensitive data to be stored only on a few specific nodes. However, private training data for Federated Learning can be leaked through the gradients sharing mechanism deployed in distributed models, thus forfeiting the purpose of privacy protection. Ideally, a data privacy protection algorithm would delete user data right after use, but existing online learning frameworks cannot meet this need without addressing the distribution shift from public data (source domain) to private user data (target domain).

Embodiments described herein provide an online domain adaptation framework based on cross-domain bootstrapping for online domain adaptation, in which the target domain streaming data is deleted immediately after adapted. At each online query, the data diversity is increased across domains by bootstrapping the source domain to form diverse combinations with the current target query. To fully take advantage of the valuable discrepancies among the diverse combinations, a set of independent machine learning models (referred to as "learners") are trained to preserve the differences. The knowledge of the learners are then integrated by exchanging their predicted pseudo-labels on the current target query to co-supervise the learning on the target domain, but without sharing the weights to maintain the learners' divergence.

In one embodiment, at inference/testing stage, a more accurate prediction may be obtained for the current target query by an average ensemble of the diverse expertise of all the learners. In this way, the right to be forgotten of each user can be realized by deleting the target querying right after the training or testing, while knowledge contained in the target query can be transferred to the public training data (source domain) for the learners.

For example, prediction model may be trained to identify an object in an input image, e.g., a "check shirt," a "sneaker," a "spaghetti strap top," and/or the like. Source domain data (e.g., public data including different types of clothing items) from Fashion-MNIST (Xiao et aL, Fashion-mnist: a novel image dataset for benchmarking machine learning algorithms. arXiv preprint arXiv:1708.07747, 2017) may be used to train the prediction model. In addition, sensitive data from a target domain, e.g., photos of people wearing different types of garments shared on social media, may also be included in the training and testing of the prediction model. Such a data query in the target domain (e.g., a photo of a person wearing a type of garment) may be incorporated into the training back to increase the cross-domain data diversity. Two copies of the prediction models may generate a prediction on the data query, e.g., a predicted type of garment that the person in the photo is wearing, which can be used as pseudo labels to supervise the training. Specifically, the two copies of prediction models exchange the generated pseudo-labels as co-supervision. Once the current query (e.g., the photo of the person wearing the type of garment) is adapted in the training phase, the query is deleted after being tested. In this way, the user photo (even if the user voluntarily shares his or her photo on the Internet) is erased from the training data.

Figure 1:
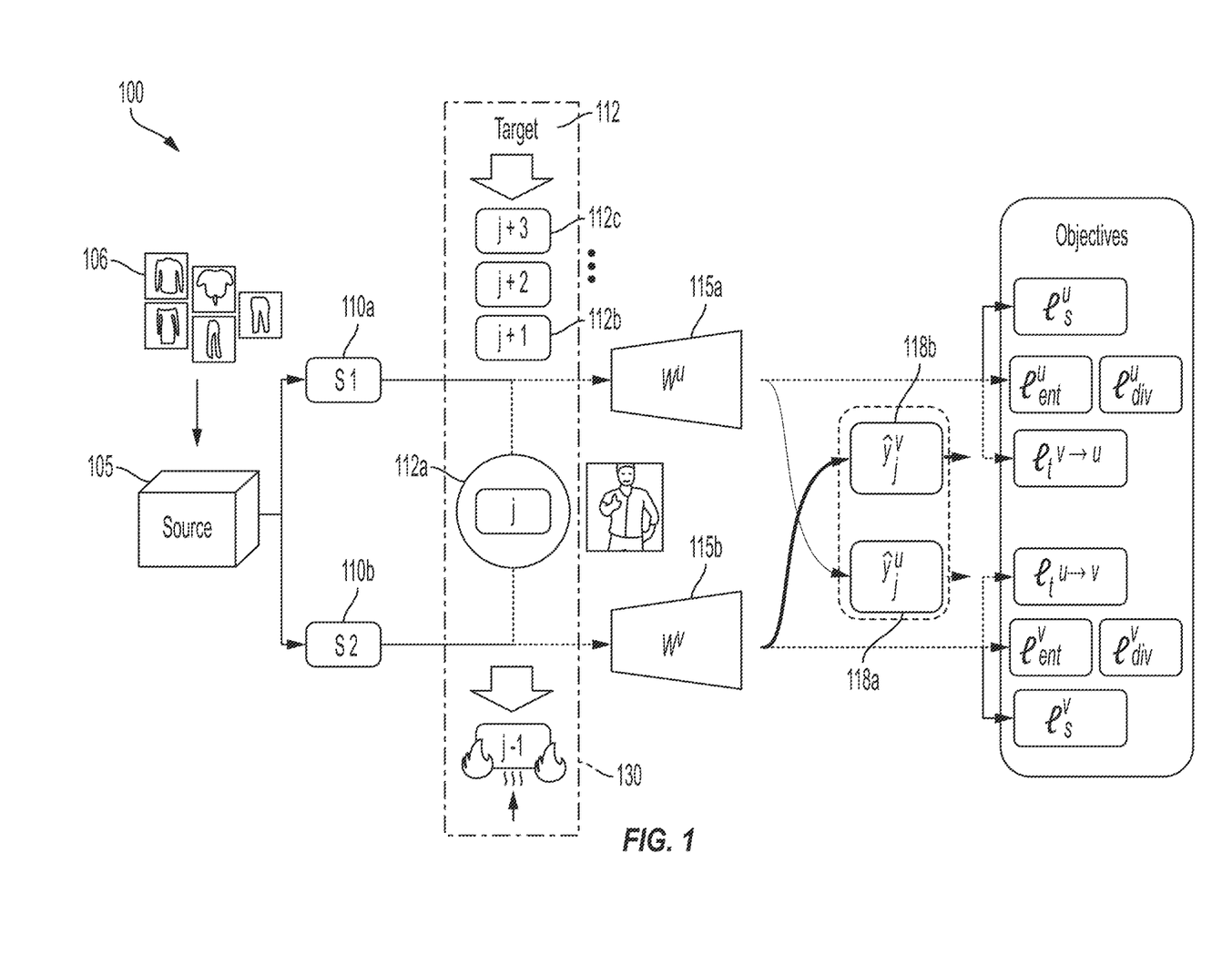
FIG. 1 is a simplified diagram of a cross-domain bootstrapping framework for online domain adaptation, according to one or more embodiments described herein.

FIG. 1 is a simplified diagram of a cross-domain bootstrapping framework 100 for online domain adaptation, according to one or more embodiments described herein. At each iteration, the training framework 100 adapts from a public source domain 105 to a streaming online target domain 112. At each iteration, only the current j-th query 112a is available from the target domain 112. The framework 100 then bootstraps the source domain batches 110a or 110b that combine with the current j-th query 112a in order to increase the cross-domain data diversity. The learners $w^u$ and $w^v$ 115a-b exchange the generated pseudo-labels $\hat{y}_j^u$ 118a and $\hat{y}_j^v$ 118b as co-supervision to compute the training objectives. Once the current query is adapted in the training phase shown, it is tested immediately to make a prediction. Each target query is deleted after tested, e.g., at 130.

Specifically, the labeled source data $D_S=\{(s_i, y_i)\}_{i=1}^{N_S}$ 105 may include public data 106 (e.g., a public image dataset) drawn from source distribution $p_s(x, y)$, where $N_S$ represents the number of image samples in the source dataset 105. For example, the public dataset 105 may be a public dataset such as Fashion-MNIST, which contains good quality and annotated image samples 106.

The unlabeled target data $D_T=\{t_i\}_{i=1}^{N_T}$ 112 may include user sensitive data (e.g., user shared photos on social media, and/or the like) drawn from the target distribution $p_t(x, y)$, where $N_T$ represent the number of image samples in the target dataset 112. An (offline or online) adaptation approach aims at training a prediction model, e.g., a classifier 115a or 115b (collectively referred to as 115) that makes accurate predictions on $D_T$.

For example, offline adaptation assumes access to every data point in $D_S$ or $D_T$, synchronous or asynchronous domain-wise. The inference on $D_T$ happens after the prediction model 115 is trained on both $D_S$ and $D_T$ entirely. For online adaptation, access to the entire $D_S$ is assumed, while the data from $D_T$ arrives in a random streaming fashion of mini-batches $\{T_j=\{t_b\}_{b=1}^B\}_{j=1}^{M_T}$, where B is the batch size, $M_T$ is the total number of target batches. Each mini-batch T is first adapted, tested and then erased from $D_T$ without replacement. As used herein, each online batch, which contains one or more image samples, may be referred to as a target query 112a.

One challenge of online adaptation is the limited access to the training data at each query, compared to offline adaptation. For example, for online adaptation, the target queries from the target dataset 112 may be received sequentially on a one-by-one basis while the model 115 is being trained. Assuming there are $10^3$ source and target batches respectively. In an offline setting, the model 115 is tested after training on at most $10^6$ combinations of source-target data pairs, while in an online setting, a one-stream model can see at most $10^3+500$ combinations at the 500-th query. Thus, online adaptation faces a significantly smaller data pool and data diversity, and the training process of the online task suffers from two major drawbacks. First, the model is prone to underfitting on target domain due to the limited exposure, especially at the beginning of training. Second, due to the erasure of "seen" batches, the model lacks the diverse combinations of source-target data pairs that enable the deep network to find the optimal cross-domain classifier. In view of the challenge, the training framework 100 in FIG. 1 increases the data diversity by cross-domain bootstrapping, which are preserved in multiple independent copies of the classifier (e.g., learners 115a-b). Then valuable discrepancies of these learners 115a-b are explored by exchanging their expertise on the current target query to co-supervise each other.

In the online setting, the target samples cannot be reused in the training due to user privacy concern. Data diversity may be increased across domains by bootstrapping the source domain to form diverse combinations with the current target domain query. Specifically, for each target query $T_j$ 112a, a set of K mini-batches 110a-b are randomly selected, e.g., $\{S_j^k=\{(s_b)_{b=1}^B\}\}_{k=1}^K$ of the same size from the source domain with replacement. Correspondingly, a set of K base learners $\{w^k\}_{k=1}^K$ 115a-b which are the copies of a classifier are obtained. It is worth noting that the framework 100 in FIG. 1 shows only two training branches of two learners 115a-b for illustrative purpose only. In other examples, another number K (K=3, 4, 5, . . . ) of learners may be trained from K mini-batches of data in parallel.

As shown in framework 100, at each iteration, a learner $w^k$ 115a or 115b is first trained on the combination of source data 110a and the target query 112a, e.g., $\{T_j, S_j^k\}$. Specifically, the independent learners 115a-b may have preserved the valuable discrepancies of cross-domain pairs, the framework 100 aims at integrating the learners' expertise into one better prediction on the current target query 112a. The K learners 115a-b may be trained jointly by exchanging their knowledge on the target domain as a form of co-supervision.

In one embodiment, the K learners (e.g., 115a-b) are trained independently with bootstrapped source supervision, but they exchange the pseudo-labels generated for target queries 112a. For example, when K=2 for simplicity, the learners are denoted as $w^u$ 115a and $w^v$ 115b. Given the current target query $T_j$ 112a, the loss function L for each learner 115a-b consists a supervised loss term $\ell_s$ from the source domain with the bootstrapped samples $\{(s_b)_{b=1}^B\}$, and a self-supervised loss term $\ell_t$ from the target domain with pseudo-labels $\hat{y}_b$ (e.g., 118a or 118b) from the peer learner. In the example shown in FIG. 1, if the cross-entropy between two probability distributions is denoted as H(;), the self-supervised loss term $\ell_t$ for each learner 115a or 115b is computed as:

$$\ell_t^{v \to u} = B^{-1} \sum_{b=1}^{B} \mathbb{1}(p_b^u \geq T) \mathcal{H}(\hat{y}_b^v; p(c \mid \tilde{t}_b; w^u))$$

$$\ell_t^{u \to v} = B^{-1} \sum_{b=1}^{B} \mathbb{1}(p_b^u \geq T) \mathcal{H}(\hat{y}_b^u; p(c \mid \tilde{t}_b; w^v))$$

$p_b^u$ and $p_b^v$ are the predicted probabilities of source training sample $t_b$ by $w^u$ and $w^v$, respectively. $\tilde{t}_b$ is a strongly-augmented version of $t_b$, and $\tau$ is the threshold for pseudo-label selection. In addition, to take advantage of the supervision from the limited target query, from $p_b^u$ and $p_b^v$, an entropy minimization term $\ell_{ent}$ and a class-balancing diversity term $\ell_{div}$ may be further added to the loss function L. For example, the entropy loss $\ell_{ent}$ may be computed as the cross-entropy between $p_b^u$ and $p_b^v$. The class-balancing diversity term $\ell_{div}$ may be computed according to Liang et al., Do we really need to access the source data? source hypothesis transfer for unsupervised domain adaptation. In International Conference on Machine Learning, 2020.

After computing the loss terms, the learners 115a-b are then updated by:

$$w^u \leftarrow w^u - \eta(\nabla \ell_s(w^u, S_j^u) + \nabla \ell_t^{v \to u}$$
$$+ \nabla \ell_{ent}(w^u, T_j) + \lambda \nabla \ell_{div}(w^u, T_j))$$
$$w^v \leftarrow w^v - \eta(\nabla \ell_s(w^v, S_j^v) + \nabla \ell_t^{u \to v}$$

-continued $$+\nabla \ell_{ent}(w^v, T_j) + \lambda \nabla \ell_{div}(w^v, T_j))$$

where λ is a hyperparameter that scales the weight of the diversity term. To generalized to K leaners, a learner $w^k$ is updated via:

$$w^k \leftarrow w^k - \eta(\nabla \mathcal{L}(w^k, \{T_j, S_j^k\}))$$

$$p_j^k = p(c|T_j; w^k)$$

where η is the learning rate, c is the number of classes, $p_j^k$ is the predicted probability by the k-th learner, and L(,) is the loss objective function.

Figure 2:
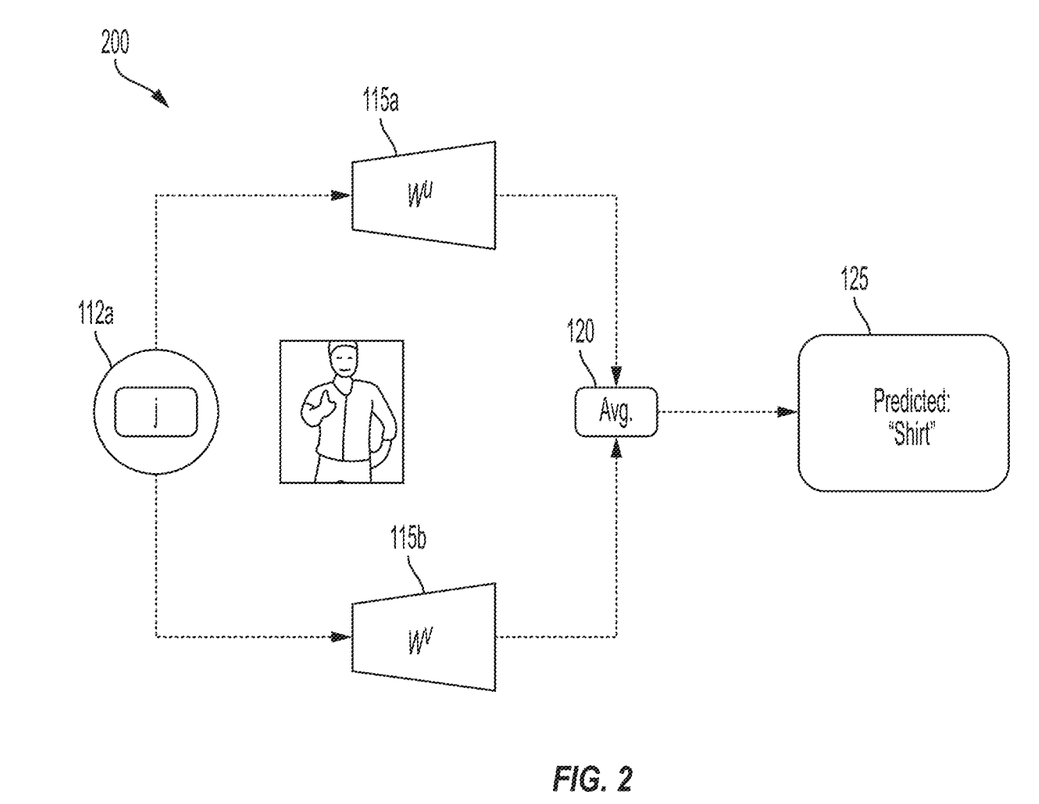
FIG. 2 is a simplified diagram of a testing framework for the cross-domain bootstrapping framework 100 for online domain adaptation shown in FIG. 1, according to one or more embodiments described herein.

FIG. 2 is a simplified diagram of a testing framework 200 for the cross-domain bootstrapping framework 100 for online domain adaptation shown in FIG. 1, according to one or more embodiments described herein. After the learners 115a-b are trained on $\{T_j, S_j^k\}$, the trained learners 115a-b may generate a predicted class for $T_j$ 112a by taking an average 120 of K predictions of the base learners (e.g., 115a-b). For example, the averaged prediction class may yield the testing result 125, e.g., a predicted class of "Shirt."

The testing may be performed at the end of the iteration. In this way, each iteration handles a target query 112a from the target dataset 112, and comprises a training stage shown in FIG. 1, and a testing stage shown in FIG. 2. At the end of the iteration, the target query is erased, e.g., as shown at 130 in FIG. 1.

Therefore, to obtain a good estimation of the current target query 112a, the bootstrapping framework 100 for uncertainty estimation on the target domain 112 offsets the source dominance. With the scarcity of target samples 112a-n, source-target data pairs are bootstrapped for a more balanced cross-domain simulation. At a high-level, the bootstrap simulates multiple realizations of a specific target query given the diversity of source samples. Specifically, the bootstrapped source approximate a distribution over the current query $T_j$ 112a via the bootstrap.

In this way, the bootstrapping framework 200 brings multi-view observations on a single target query 112a by two means. First, given K sampling subsets from $D_S$, if letting $\mathcal{F}$ be the ideal estimate of $T_j$, $\hat{\mathcal{F}}$ be the practical estimate of the dataset, and $\hat{\mathcal{F}}^*$ be the estimate from a bootstrapped source paired with the target query, $$\hat{\mathcal{F}}^* = K^{-1} \sum_{k=1}^{K} \hat{\mathcal{F}}_k^*$$

will be the average of the multi-view K estimates. Second, besides the learnable parameters, the Batch-Normalization layers of K learners generate result in a set of different means and variances $\{\mu_k, \sigma_k\}_{k=1}^{K}$ that serve as K different initializations that affects the learning of $\hat{\mathcal{F}}^*$.

Figure 3:
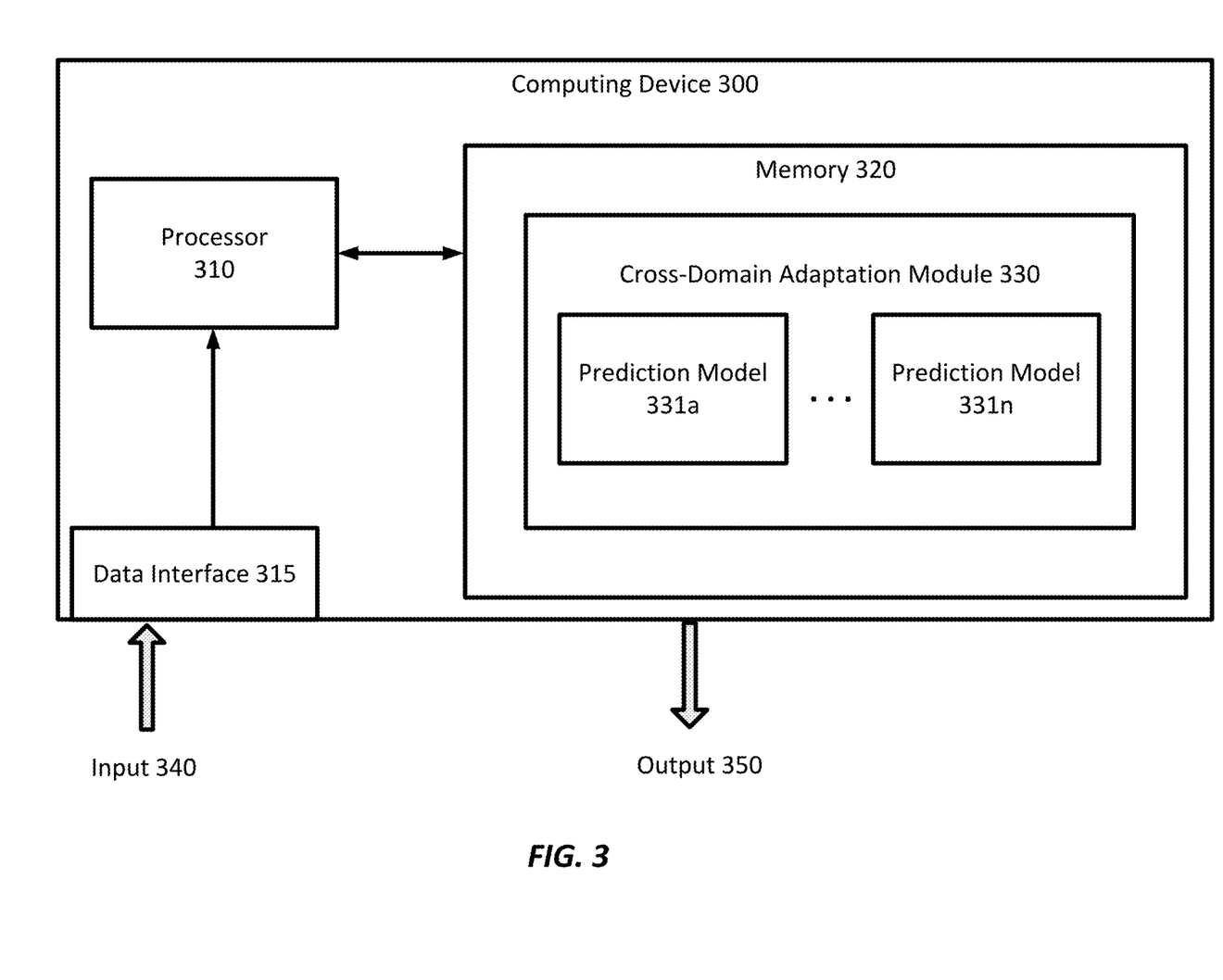
FIG. 3 is a simplified diagram of a computing device for implementing the cross-domain adaptation, according to some embodiments.

FIG. 3 is a simplified diagram of a computing device for implementing the cross-domain adaptation, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for an online adaptation module 330 that may be used to implement and/or emulate the systems and models, and/or to implement any of the methods described further herein. In some examples, the online adaptation module 330, may receive an input 340, e.g., such as source data or a target query via a data interface 315. The online adaptation module 330 may generate an output 350 in response to the input 340. For example, the output 350 may be a prediction label of the input target query.

In some examples, the online adaptation module 330 may include a plurality of prediction models 331a-331n, which may be a number of copies of a prediction model (e.g., see 115a-b as an example). The cross-domain adaptation module 330 and its submodules prediction models 331a-n may be implemented using hardware, software, and/or a combination of hardware and software.

Figure 4:
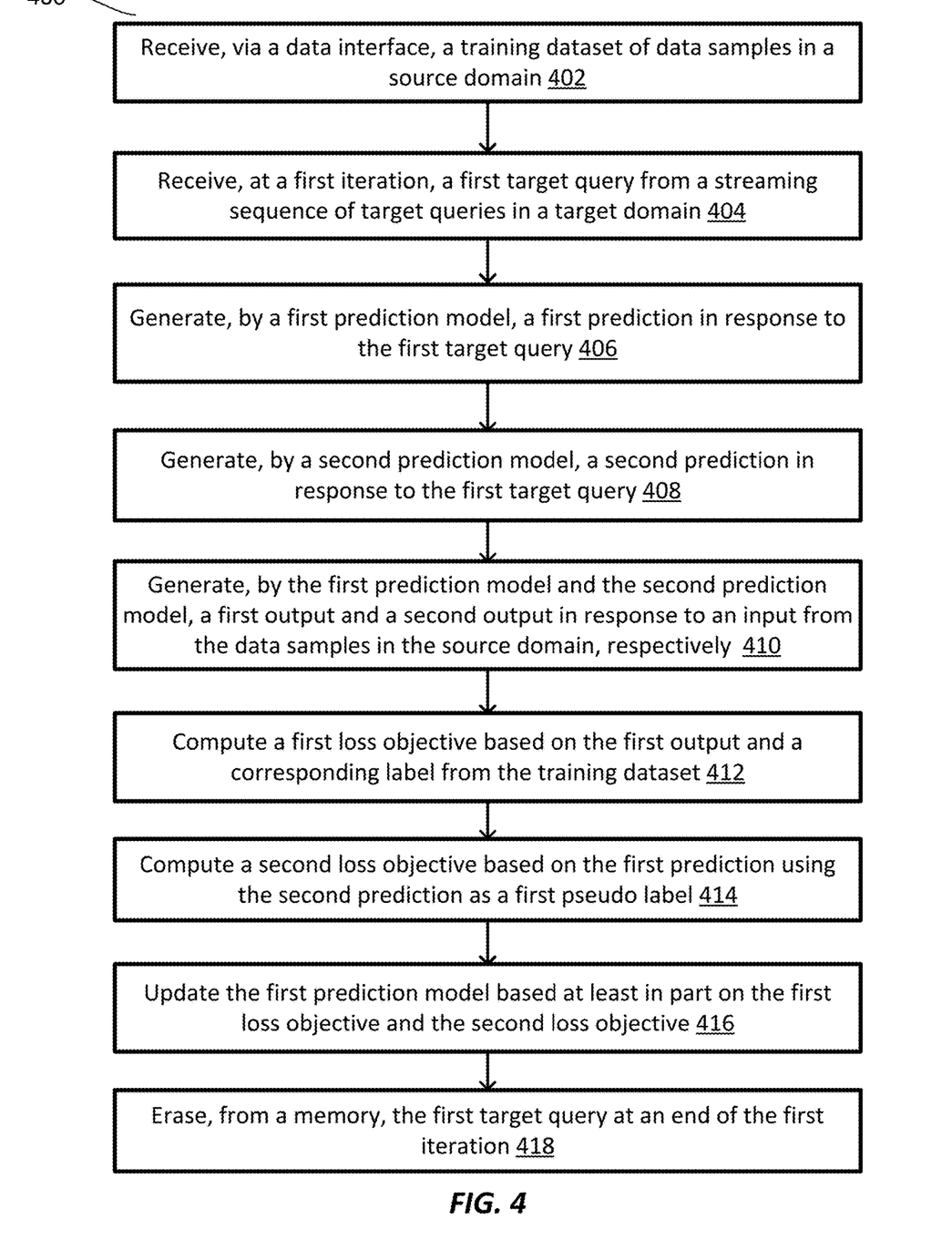
FIG. 4 is a simplified logic flow diagram illustrating a method of online cross-domain adaptation from a public domain to a target domain containing sensitive data, according to one or more embodiments described herein.

FIG. 4 is a simplified logic flow diagram illustrating a method of online cross-domain adaptation from a public domain to a target domain containing sensitive data, according to one or more embodiments described herein. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the video pretraining module 330 (FIG. 3) to perform contrastive pretraining with video tracking supervision.

At step 402, a training dataset of data samples (e.g., public data 106 in FIG. 1) in a source domain is received via a data interface (e.g., 315 in FIG. 3).

At step 404, a first target query (e.g., 112a in FIG. 1) from a streaming sequence of target queries in a target domain (e.g., 112 in FIG. 1) is received, at a first iteration. For example, the first target query comprises a set of sequentially received data samples from the streaming sequence.

In one embodiment, a first set of data samples and a second set of data samples are sampled from the training dataset in the source domain. Each has a same number of data samples as the set of sequentially received data samples. The first set of data samples or the second set of data samples are then sent as the input to the first prediction model or the second prediction model, respectively.

At step 406, a first prediction model (e.g., 115a in FIG. 1) generates a first prediction (e.g., 118a in FIG. 1) in response to the first target query.

At step 408, a second prediction model (e.g., 115b in FIG. 1) generates a second prediction (e.g., 118b in FIG. 1) in response to the first target query.

At step 410, the first prediction model and the second prediction model generate a first output and a second output in response to an input from the data samples in the source domain, respectively.

At step 412, a first loss objective is computed based on the first output and a corresponding label from the training dataset, e.g., the supervised loss $l_s^u$. For example, the first loss objective is computed as a supervised loss objective supervised by pre-annotated labels of the data samples in the training dataset.

At step 414, a second loss objective based on the first prediction using the second prediction as a first pseudo label, e.g., the co-supervised loss $l_t^{v \to u}$. The second loss objective is computed by: generating the first pseudo label based on the second prediction; and in response to determining that the second prediction is greater than a pre-defined threshold, computing a cross entropy between the first pseudo label and a distribution of the first prediction.

At step 416, the first prediction model is updated based at least in part on the first loss objective and the second loss objective.

Similarly, the second prediction model may be updated by performing similar steps as steps 412-416. For example, a third loss objective is computed based on the second output and the corresponding label from the training dataset. A fourth loss objective is computed based on the second prediction using the first prediction as a second pseudo label. The second prediction model is updated based at least in part on the third loss objective and the fourth loss objective.

In one embodiment, an entropy loss objective may be computed based on a distribution of the first prediction. A class-balancing diversity loss objective may be computed based on the distribution of the first prediction. The first prediction model may be jointly updated based on the first loss objective, the second loss objective, the entropy loss objective and the class-balancing diversity loss objective.

At step 418, the first target query (e.g., 112a in FIG. 1) is erased at an end of the first iteration from a memory.

Some examples of computing devices, such as computing device 300 may include non-transitory, tangible, machine readable media that include executable code that when run by one or more processors (e.g., processor 110) may cause the one or more processors to perform the processes of method. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Performance

Two metrics have been adopted for evaluating online domain adaptation methods described in FIGS. 1-4: online average accuracy and one-pass accuracy. The online average is an overall estimate of the streaming effectiveness. The one-pass accuracy measures after training on the finite-sample how much the online model has deviated from the beginning. A one-pass accuracy much lower than online average indicates that the model might have overfitted to the fresh queries, but com-promised its generalization ability to the early queries. Dataset. VisDA-C (Visda: A synthetic-to-real benchmark for visual domain adaptation, in Proceedings of the IEEE Conference on Computer Vision and Pattern Recognition Workshops, 2018), a classic benchmark adapting from synthetic images to real. The COVID-DA (Zhang et al., Covid-da: Deep domain adaptation from typical pneumonia to covid-19. arXiv preprint arXiv:2005.01577, 2020), adapts the CT images diagnosis from common pneumonia to the novel disease. This is a typical scenario where online domain adaptation is valuable in practice. When a novel disease breaks out, without any prior knowledge, one has to exploit a different but correlated domain to assist the diagnosis of the new pandemic in a time-sensitive manner. The online cross-domain adaptation is evaluated on a large-scale medical dataset Camelyon17 from the WILDS (Koh et aL, Wilds: A benchmark of in-the-wild distribution shifts. In International Conference on Machine Learning, 2021), a histopathology image dataset with patient population shifts from source to the target. Camelyon17 has 455 k samples of breast cancer patients from 5 hospitals. Another practical scenario is the online fashion where the user-generated content (UGC) might be time-sensitive and cannot be saved for training purposes. Due to the lack of cross-domain fashion prediction dataset, adaptation from Fashion-MNIST to-DeepFashion category pre-diction branch is evaluated. For example, 6 fashion categories are selected shared between the two datasets, and design the task as adapting from 36,000 grayscale samples of Fashion-MNIST to 200, 486 real-world commercial samples from DeepFashion.

In one embodiment, the cross-domain adaptation framework 100 is implemented using Pytorch. ResNet-101 is used on VisDA-C pretrained on ImageNet. Pretrained ResNet-18 (He et al., Deep residual learning for image recognition. In Proceedings of the IEEE conference on computer vision and pattern recognition, 2016) is used on COVID-DA. DenseNet-121 (Huang et al., Densely connected convolutional networks, In Proceedings of the IEEE conference on computer vision and pattern recognition, 2017) is used on Camelyon17 with random initialization, and the official WILDS codebase 3 is used for data split and evaluation. The pretrained ResNet-101 is used on Fashion-MNIST-to-DeepFashion. The confidence thresh-old $\tau=0.95$ and diversity weight $\lambda=0.4$ are fixed throughout the experiments.

Example baseline models for comparison include DAN (Long et al., Learning transferable features with deep adaptation networks, in International conference on machine learning, 2015), CORAL (Sun et aL, Return of frustratingly easy domain adaptation, in AAAI, 2016), DANN (Domain-adversarial training of neural networks, in proceedings of JMLR, 2016), ENT (Grandvalet et aL, Semi-supervised learning by entropy minimization, CAP, 2005), MDD (Zhang), CDAN (Long et al., Conditional adversarial domain adaptation, arXiv preprint arXiv:1705.10667, 2017), SHOT and ATDOC (Liang et al., Domain adaptation with auxiliary target domain-oriented classifier, in Proceedings of the IEEE/CVF Conference on Computer Vision and Pattern Recognition, 2021). ATDOC has multiple variants of the auxiliary regularizer, which is compared with the Neighborhood Aggregation (ATDOC-NA) with the best performance. Among the compared approaches, SHOT and ATDOC-NA require a memory module that collects and stores information of all the target samples, thus only apply the offline setting. For the other six approaches, we compare both offline and online results. Each offline model is trained for 10 epochs, and each online model takes the same randomly-perturbed target queries to make a fair comparison.

Figure 5:
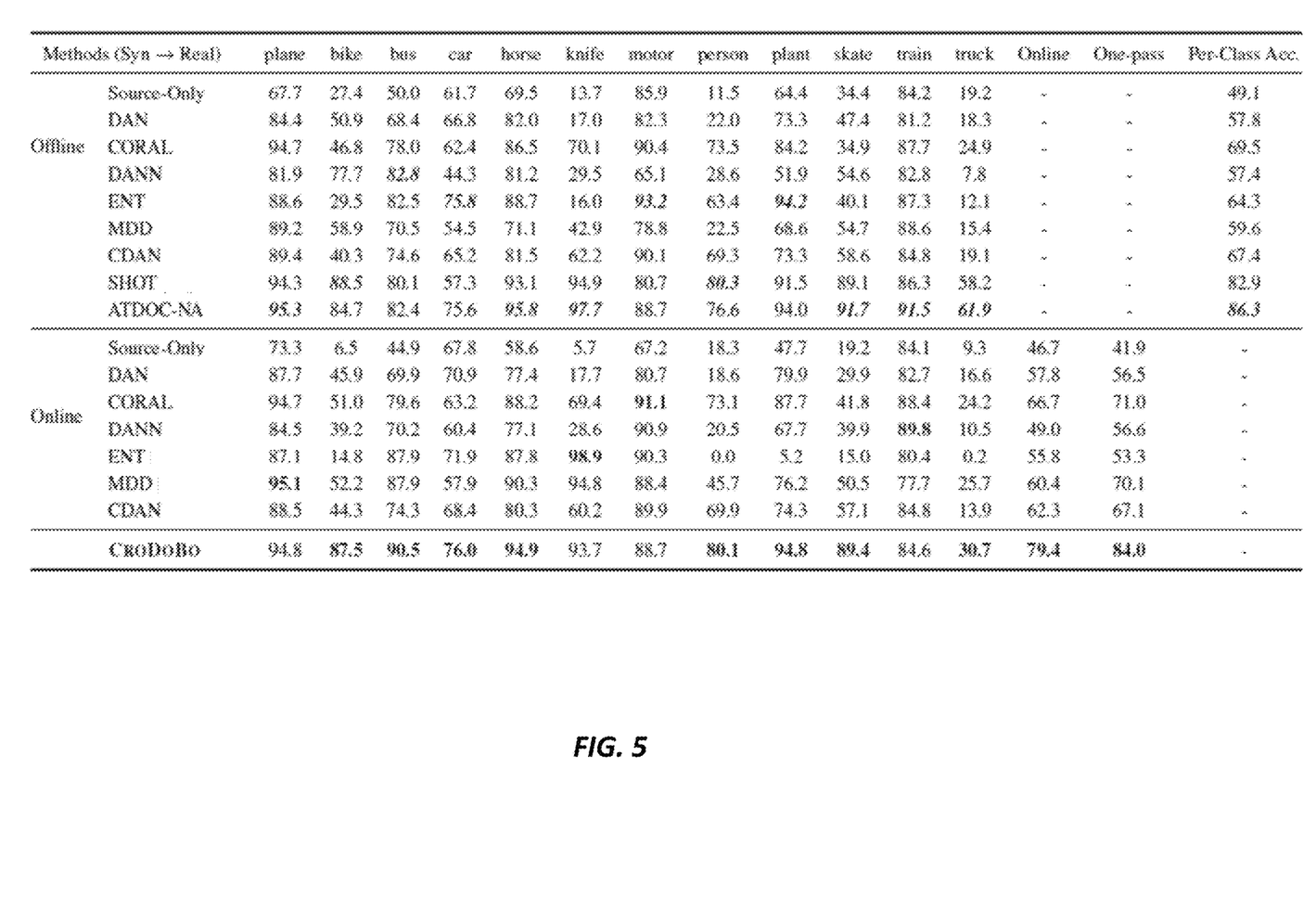
FIGS. 5-12 provide example data performance plots and examples illustrating performance of the training framework of the online adaptation module, according to one embodiment described herein.
Figure 8:
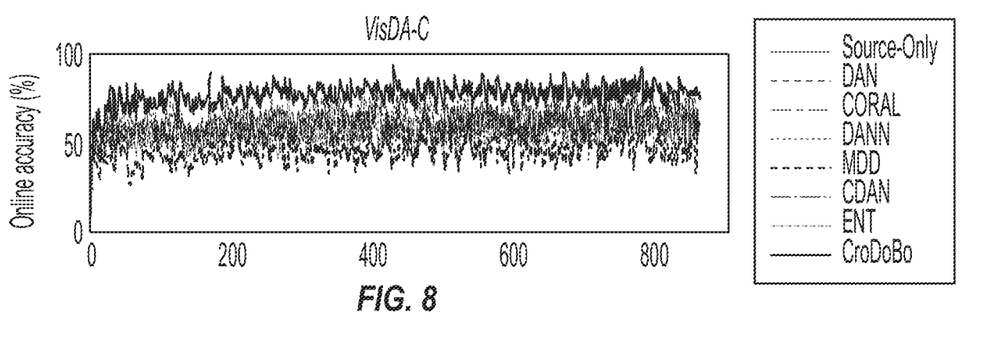

FIG. 5 shows the comparison in online accuracy on VisDA-C, and performances are plotted in FIG. 8. To make a fair comparison, the VisDA-C one-pass accuracy in class average is provided. Among the offline methods, SHOT and ATDOC-NA largely outperforms other approaches, showing the effectiveness of target domain clustering. Regarding the on-line setting, the Source-Only baseline loses 2.4% in the on-line average and 7.2% in the one-pass accuracy, which in-dicatates that the data diversity is also important in domain generalization. ENT, which is an entropy regularizer on the posterior probabilities of the un-labeled target samples, has a noticeable performance drop in the online setting, and illustrates obvious imbalanced results over the categories (superior at class "knife" but poor at "person" and "truck"). IT can be considered a typical example of bad objective choice for the online setting when the dataset is imbalanced. Without sufficient rounds to provide data diversity, entropy minimization might easily overfit the current target query. The 2.5% drop in one-pass from online further confirmed the model has deviated from the beginning. The cross-domain adaptation method (referred to as "CRODOBO") outperforms other methods in the online setting by a large margin. For the sake of time efficiency, CRODOBO is superior than other approaches by achieving high accuracy in only one epoch.

Figure 6:
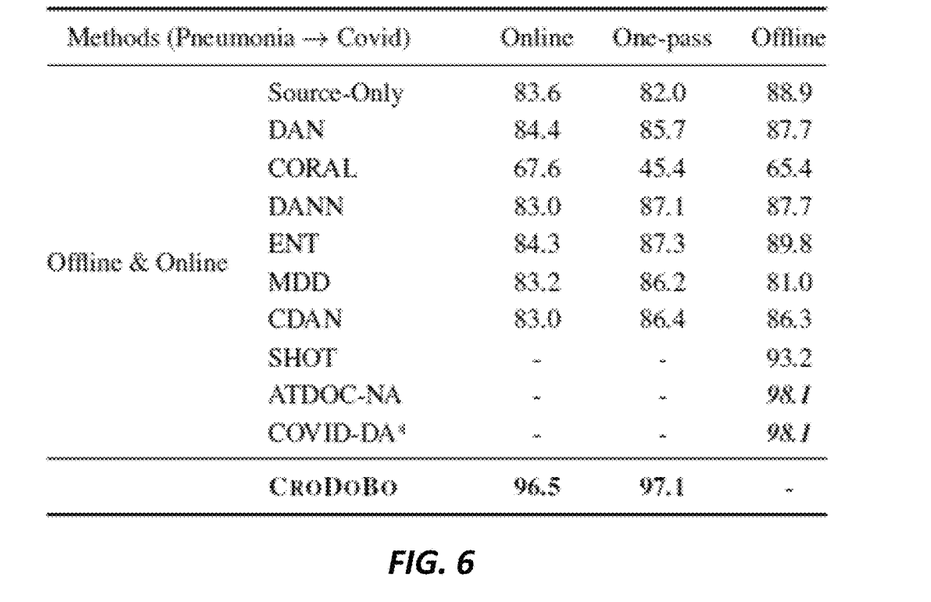
Figure 7:
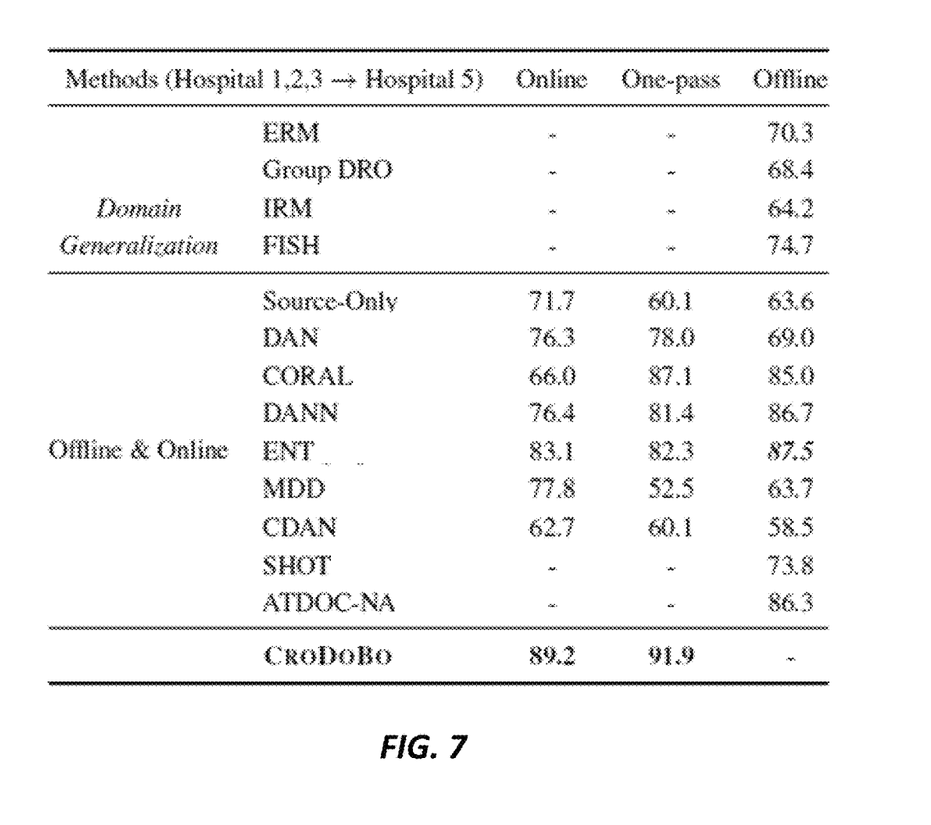
Figure 9:
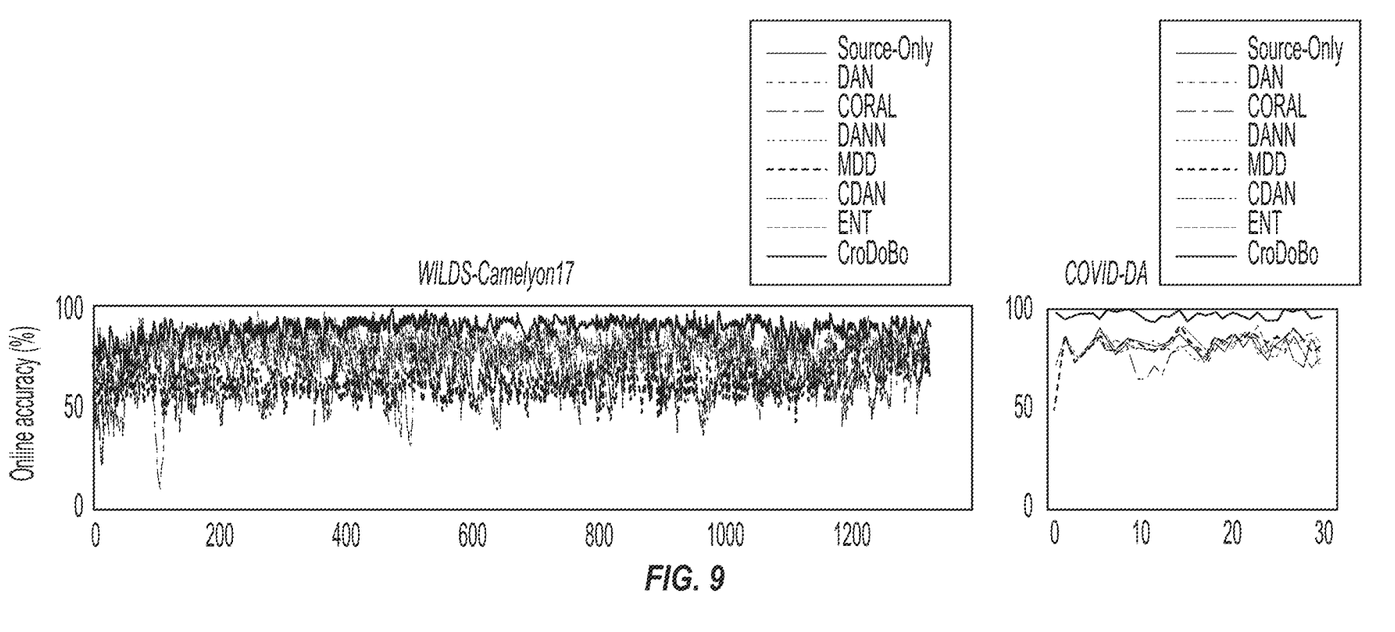

The results on two medical imaging datasets COVID-DA and WILDS-Camelyon17 are respectively summarized in FIG. 6 and FIG. 7. The online streaming ac-curacy is presented in FIG. 9. COVID-DA* is the method proposed along with the dataset, which is a domain adversarial-based multi-classifier approach with focal loss regularization. CRODOBO outperforms the other approaches on COVID-DA regarding the online and one-pass metric, and achieves competitive performance against the best offline accuracy. On the large-scale benchmark WILDS-Camelyon17, CRODOBO outperforms the offline results by 1.7%, which validates the effectiveness of the approach. CRODOBO also obtains more competitive results on large-scale datasets than small ones. Compared to the COVID-DA dataset (2,029 target samples), WILDS-Camelyon17 (85,054 target samples) is significantly more extensive. The good performance on larger number of target queries indicates that CRODOBO can well exploit the underlying information from the target domain. Similar observations are made on the large-scale Fashion benchmark.

Figure 10:
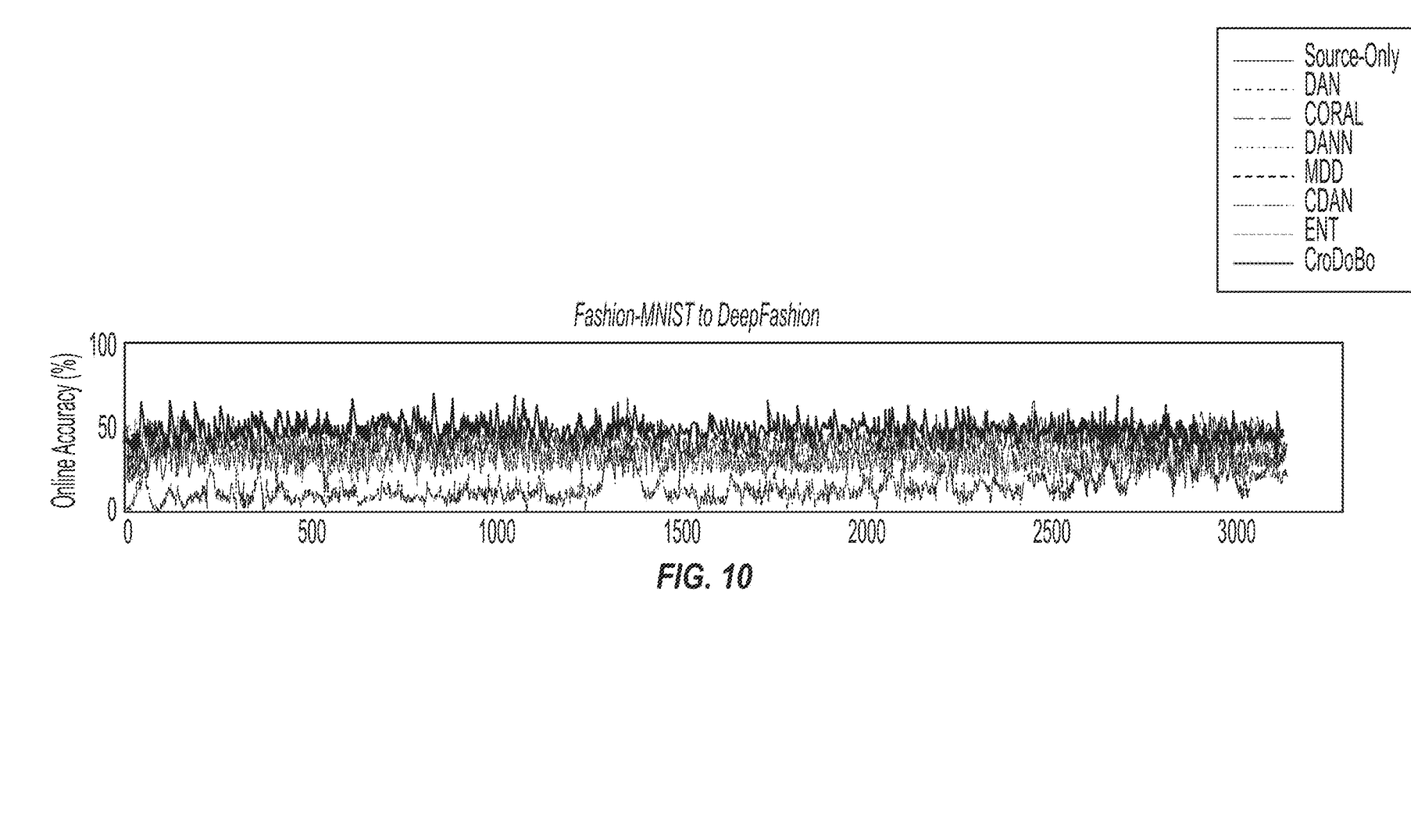
Figure 11:
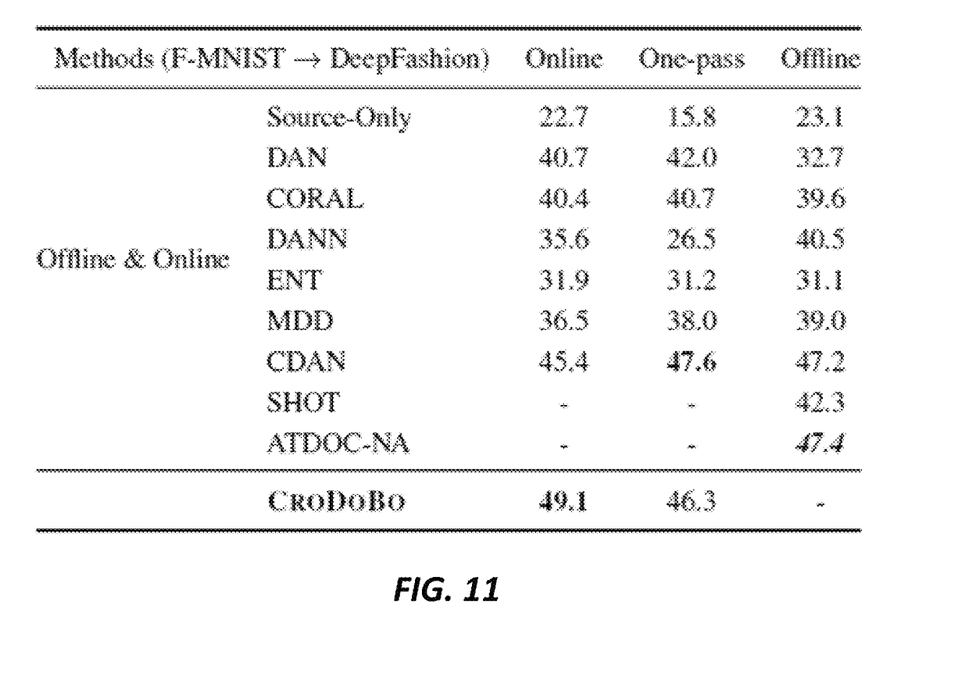

The results on the newly proposed large-scale Fashion benchmark, from Fashion-MNIST to DeepFashion category prediction branch, is summarized in FIG. 11, and the online streaming accuracy is plotted in FIG. 10. The offline Source-Only merely achieves 23.1% accuracy, only 6.5% gain on the basis of the probability of guessing, which indicates the benchmark is challenging. The sharp drop of performance from Source-Only online accuracy to one-pass accuracy (−6.8%) indicates the large domain gap, and how easy the model is dominated by the source domain supervision. Similar observation is made on WILDS-Camelyon17 Source-Only results (−11.6% from online to one-pass), this usually happens when the source domain is less challenging than the target domain, and the distribution of the two domains are far from each other. Faced with this challenging benchmark, CRODOBO improves the online performance to a remarkable 49.1%, outperforming the best result in the offline setting.

Figure 12:
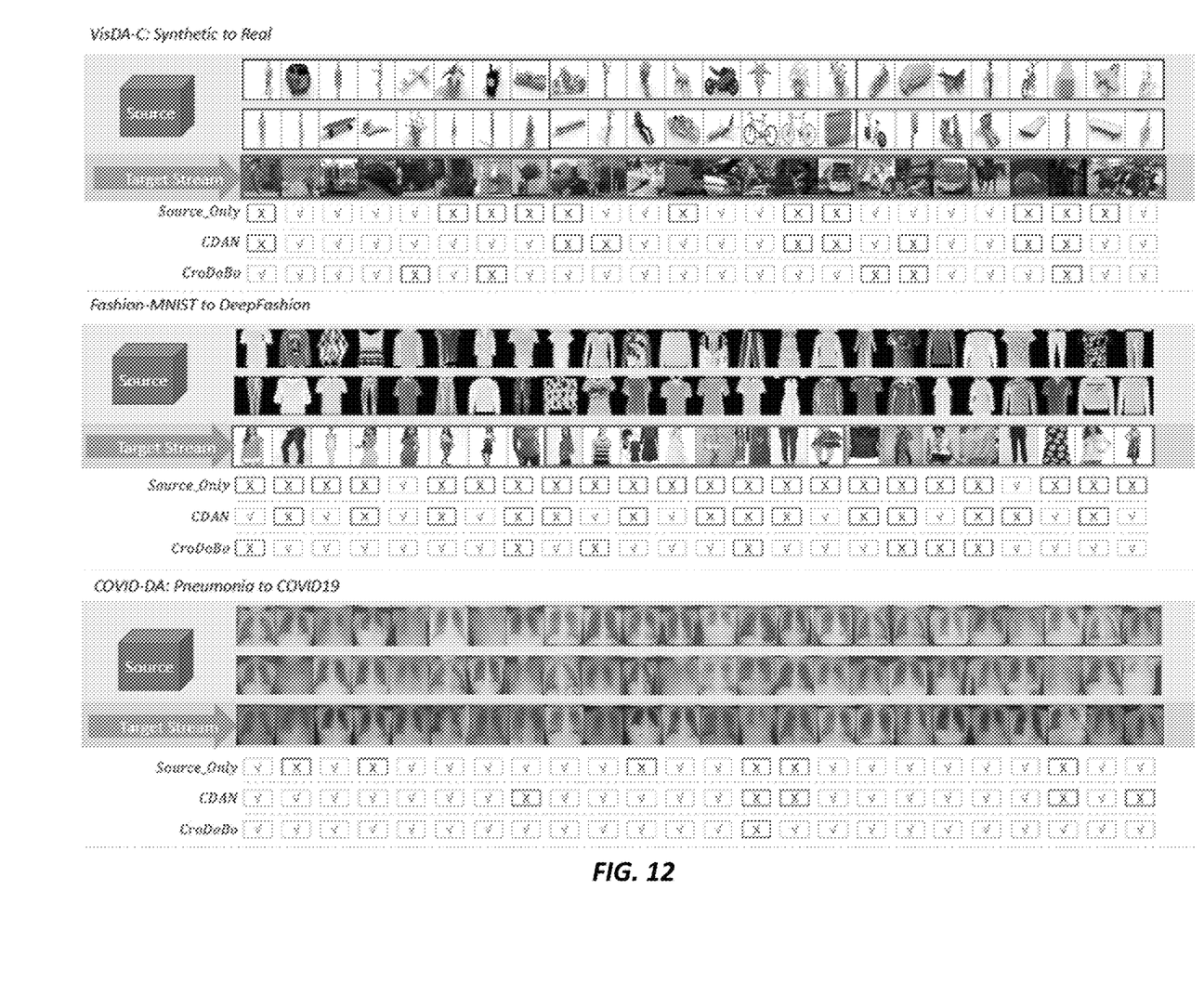

FIG. 12 shows example qualitative results of a randomly selected target query (size 24). The proposed cross-domain adaptation framework 100 (CRODOBO) is compared with two essential baselines Source-Only and CDAN. The bootstrapped source samples (top two rows under each benchmark), target samples (third row under each benchmark), and the prediction result of each target sample are illustrated.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training one or more neural network prediction models for image recognition via online adaptation for cross-domain data, the method comprising:
receiving, via a data interface, a training dataset of image samples in a source domain;
receiving, at a first training iteration of the one or more neural network prediction models, a first target image query from a streaming sequence of target image queries in a target domain;
generating, by a first neural network prediction model implemented on one or more hardware processors, a first prediction relating to at least one item in the first target image query;

generating, by a second neural network prediction model implemented on one or more hardware processors, a second prediction relating to the at least one item in the first target image query;

generating, by the first neural network prediction model and the second neural network prediction model, a first output and a second output each identifying a respective probability that the at least one item is in an input image sample from the training dataset, respectively;

in response to determining that the second output is greater than a pre-defined threshold, selecting the second prediction as a first pseudo label;

training at least the first neural network prediction model based on a weighted sum of (i) a first loss objective computed as a cross-entropy between the first output and a corresponding label from the training dataset, and (ii) a second loss objective computed as a cross-entropy between the first prediction and the selected second prediction as the first pseudo label;

erasing, from a memory, the first target query at an end of the first training iteration of the one or more neural network prediction models; and performing, using the trained first neural network prediction model, image recognition of a testing image.

2. The method of claim 1, wherein the first loss objective is computed as a supervised loss objective supervised by pre-annotated labels of the image samples in the training dataset.

3. The method of claim 1, wherein the first target image query comprises a set of sequentially received image samples from the streaming sequence.

4. The method of claim 3, further comprising:
sampling, from the training dataset in the source domain, a first set of image samples and a second set of image samples, each having a same number of image samples as the set of sequentially received image samples; and
sending the first set of image samples or the second set of image samples as the input to the first prediction model or the second prediction model, respectively.

5. The method of claim 1, further comprising:
computing a third loss objective based on the second output and the corresponding label from the training dataset; and
computing a fourth loss objective based on the second prediction using the first prediction as a second pseudo label; and
updating the second prediction model based at least in part on the third loss objective and the fourth loss objective.

6. The method of claim 1, further comprising:
computing an entropy loss objective based on a distribution of the first prediction;
computing a class-balancing diversity loss objective based on the distribution of the first prediction; and
jointly updating the first prediction model based on the first loss objective, the second loss objective, the entropy loss objective and the class-balancing diversity loss objective.

7. The method of claim 1, wherein performing image recognition further comprising:
after trained the first prediction model and the second prediction model:
generating, by the trained first prediction model and the trained second prediction model, a first testing prediction and a second testing prediction in response to the first target image query, respectively; and computing an average of the first testing prediction and the second testing prediction as a testing label for the first target image query before erasing the first target image query.

8. The method of claim 1, wherein the source domain contains public data, and the target domain contains sensitive data pertaining to user privacy.

9. The method of claim 1, further comprising:
for the first target image query, randomly sampling a number of batches of image samples from the training dataset, wherein the number of batches equals to a number of neural network prediction models to be trained;
generating, by each of the number of neural network prediction models, a respective prediction in response to the first target image query;
generating, by each of the number of neural network prediction models, a respective set of outputs in response to a batch of image samples;
computing, for each of the number of neural network prediction models:
a co-supervised loss objective based on the respective prediction using a prediction from another neural network prediction model as a pseudo label;
a supervised loss objective based on the respective set of outputs and corresponding pre-annotated labels of the batch of image samples from the training dataset;
an entropy loss objective based on the respective prediction; and
a class-balancing loss objective based on the respective prediction; and
jointly updating each of the number of neural network prediction models based at least in part on the co-supervised loss objective, the supervised loss objective, the entropy loss objective and the class-balancing loss objective.

10. A system of online adaptation for cross-domain data, the system comprising:
a data interface receiving a training dataset of image samples in a source domain, and receiving, at a first training iteration of one or more neural network prediction models, a first target image query from a streaming sequence of target image queries in a target domain;
a memory storing the received first target image query and a plurality of processor-executable instructions; and
a processor executing the plurality of processor-executable instructions to perform operations comprising:
generating, by a first neural network prediction model implemented on one or more hardware processors, a first prediction relating to at least one item in the first target image query;
generating, by a second neural network prediction model implemented on one or more hardware processors, a second prediction relating to the at least one item in the first target image query;
generating, by the first neural network prediction model and the second neural network prediction model, a first output and a second output each identifying a respective probability that the at least one item is in an input image sample from the training dataset, respectively;
in response to determining that the second output is greater than a pre-defined threshold, selecting the second prediction as a first pseudo label;
training at least the first neural network prediction model based on a weighted sum of (i) a first loss objective computed as a cross-entropy between the first output and a corresponding label from the training dataset, and (ii) a second loss objective computed as a cross-entropy between the first prediction and the selected second prediction as the first pseudo label;

erasing, from the memory, the first target query at an end of the first training iteration of the one or more neural network prediction models; and performing, using the trained first neural network prediction model, image recognition of a testing image.

11. The system of claim 10, wherein the first loss objective is computed as a supervised loss objective supervised by pre-annotated labels of the image samples in the training dataset.

12. The system of claim 10, wherein the first target image query comprises a set of sequentially received image samples from the streaming sequence.

13. The system of claim 12, wherein the operations further comprise:

sampling, from the training dataset in the source domain, a first set of image samples and a second set of image samples, each having a same number of image samples as the set of sequentially received image samples; and sending the first set of image samples or the second set of image samples as the input to the first prediction model or the second prediction model, respectively.

14. The system of claim 10, wherein the operations further comprise:

computing a third loss objective based on the second output and the corresponding label from the training dataset; and computing a fourth loss objective based on the second prediction using the first prediction as a second pseudo label; and updating the second prediction model based at least in part on the third loss objective and the fourth loss objective.

15. The system of claim 10, wherein the operations further comprise:

computing an entropy loss objective based on a distribution of the first prediction;

computing a class-balancing diversity loss objective based on the distribution of the first prediction; and jointly updating the first prediction model based on the first loss objective, the second loss objective, the entropy loss objective and the class-balancing diversity loss objective.

16. The system of claim 10, wherein the operations further comprise:

after trained the first prediction model and the second prediction model:

generating, by the trained first prediction model and the trained second prediction model, a first testing prediction and a second testing prediction in response to the first target image query, respectively; and computing an average of the first testing prediction and the second testing prediction as a testing label for the first target image query before erasing the first target image query.

17. The system of claim 10, wherein the operations further comprise:

for the first target image query, randomly sampling a number of batches of image samples from the training dataset, wherein the number of batches equals to a number of neural network prediction models to be trained;

generating, by each of the number of neural network prediction models, a respective prediction in response to the first target image query;

generating, by each of the number of neural network prediction models, a respective set of outputs in response to a batch of image samples;

computing, for each of the number of neural network prediction models:

a co-supervised loss objective based on the respective prediction using a prediction from another neural network prediction model as a pseudo label;

a supervised loss objective based on the respective set of outputs and corresponding pre-annotated labels of the batch of image samples from the training dataset;

an entropy loss objective based on the respective prediction; and a class-balancing loss objective based on the respective prediction; and jointly updating each of the number of neural network prediction models based at least in part on the co-supervised loss objective, the supervised loss objective, the entropy loss objective and the class-balancing loss objective.

18. A processor-readable non-transitory storage medium storing a plurality of processor-executable instructions for training one or more neural network prediction models for image recognition via online adaptation for cross-domain data, the plurality of processor-executable instructions by a processor to perform operations comprising:

receiving, via a data interface, a training dataset of image samples in a source domain;

receiving, at a first training iteration of the one or more neural network prediction models, a first target image query from a streaming sequence of target image queries in a target domain;

generating, by a first neural network prediction model implemented on one or more hardware processors, a first prediction relating to at least one item in the first target image query;

generating, by a second neural network prediction model implemented on one or more hardware processors, a second prediction relating to the at least one item in the first target image query;

generating, by the first neural network prediction model and the second neural network prediction model, a first output and a second output each identifying a respective probability that the at least one item is in an input image sample from the training dataset, respectively;

in response to determining that the second output is greater than a pre-defined threshold, selecting the second prediction as a first pseudo label;

training at least the first neural network prediction model based on a weighted sum of (i) a first loss objective computed as a cross-entropy between the first output and a corresponding label from the training dataset, and (ii) a second loss objective computed as a cross-entropy between the first prediction and the selected second prediction as the first pseudo label;

erasing, from a memory, the first target query at an end of the first training iteration of the one or more neural network prediction models; and performing, using the trained first neural network prediction model, image recognition of a testing image.

* * * * *